US009037152B1

(12) United States Patent
Herrera et al.

(10) Patent No.: US 9,037,152 B1
(45) Date of Patent: May 19, 2015

(54) SMALL FOOTPRINT REAL-TIME OPERATING SYSTEM FOR REACTIVE SYSTEMS

(76) Inventors: Alberto Herrera, Tijuana (MX); Luis Fernando Reyes, Tijuana (MX)

( * ) Notice: Subject to any disclaimer, the term of this patent is extended or adjusted under 35 U.S.C. 154(b) by 1112 days.

(21) Appl. No.: 11/559,394

(22) Filed: Nov. 13, 2006

Related U.S. Application Data

(60) Provisional application No. 60/735,592, filed on Nov. 12, 2005, provisional application No. 60/735,629, filed on Nov. 12, 2005, provisional application No. 60/735,630, filed on Nov. 12, 2005.

(51) Int. Cl.
| | |
|---|---|
| H04W 24/00 | (2009.01) |
| H04W 64/00 | (2009.01) |
| G01S 5/02 | (2010.01) |
| G06F 9/48 | (2006.01) |

(52) U.S. Cl.
CPC .............. *H04W 64/00* (2013.01); *G01S 5/0252* (2013.01); *G06F 9/4881* (2013.01)

(58) Field of Classification Search
CPC .... H04W 64/00; G01S 5/0252; G06F 9/4881; G06F 9/4887; G06F 9/30101; G06F 9/461; G06F 11/3409; G06F 2201/88; G06F 8/34; G06F 9/30054; G06F 9/3806; G06F 9/44521; G06F 9/44557; G06F 9/546; G06F 11/0715; G06F 11/0757
USPC .......... 370/331, 329, 338, 337; 455/434, 436, 455/426, 445, 456.1, 426.1, 509; 717/100, 717/109; 711/171, 109, 159, 129, 136; 340/870, 7.1, 3.1, 870.02; 709/206, 709/245; 375/E1.002
See application file for complete search history.

(56) References Cited

U.S. PATENT DOCUMENTS

| | | | | |
|---|---|---|---|---|
| 5,224,648 | A | 7/1993 | Simon | |
| 6,240,358 | B1 * | 5/2001 | Kawai | 701/114 |
| 6,671,745 | B1 * | 12/2003 | Mathur et al. | 719/328 |
| 6,823,517 | B1 * | 11/2004 | Kalman | 718/108 |
| 6,910,119 | B1 * | 6/2005 | Douglas | 712/216 |
| 7,152,145 | B2 * | 12/2006 | Kim et al. | 711/159 |
| 7,222,800 | B2 | 5/2007 | Wruck | |
| 7,447,195 | B1 * | 11/2008 | Chan et al. | 370/352 |
| 7,797,367 | B1 * | 9/2010 | Gelvin et al. | 709/200 |
| 2002/0055961 | A1 * | 5/2002 | Chauvel et al. | 708/100 |
| 2005/0050542 | A1 * | 3/2005 | Davis et al. | 718/100 |
| 2005/0086030 | A1 * | 4/2005 | Zeidman | 703/1 |
| 2005/0102650 | A1 * | 5/2005 | Kalman | 717/100 |
| 2005/0143968 | A9 * | 6/2005 | Odom et al. | 703/21 |
| 2005/0173549 | A1 | 8/2005 | Bash | |
| 2005/0194457 | A1 | 9/2005 | Dolan | |

(Continued)

OTHER PUBLICATIONS

Office Action in U.S. Appl. No. 11/559,392 Dated Apr. 27, 2009.

(Continued)

*Primary Examiner* — Mahendra Patel
(74) *Attorney, Agent, or Firm* — Stephen W. Melvin

(57) ABSTRACT

The present invention is a real-time operating system for use on embedded controllers having minimal resources controlling reactive systems or applications. One application of the present invention is in wireless sensors in a wireless sensor network. By requiring all tasks to have clearly defined start and end points, the present invention eliminates the Waiting state for a task. This allows the RTOS to have a very small memory footprint and for the RTOS to use a single call/return stack.

10 Claims, 6 Drawing Sheets

(56) References Cited

U.S. PATENT DOCUMENTS

| | | | |
|---|---|---|---|
| 2005/0240924 A1* | 10/2005 | Jones et al. | 718/100 |
| 2005/0248456 A1 | 11/2005 | Britton | |
| 2006/0053409 A1* | 3/2006 | Kornerup et al. | 717/109 |
| 2006/0080455 A1* | 4/2006 | Das et al. | 709/231 |
| 2006/0164239 A1 | 7/2006 | Loda | |
| 2007/0056369 A1 | 3/2007 | Griffin | |
| 2007/0084937 A1 | 4/2007 | Ahmed | |

OTHER PUBLICATIONS

Office Action in U.S. Appl. No. 11/559,393 Dated Mar. 19, 2009.

\* cited by examiner

SMALL FOOTPRINT REAL-TIME OPERATING SYSTEM FOR REACTIVE SYSTEMS

RELATED APPLICATIONS

This application claims priority to provisional application 60/735,592 filed on Nov. 12, 2005, to provisional application 60/735,629, filed on Nov. 12, 2005 and to application 60/735,630, filed on Nov. 12, 2005. Each of these priority documents is incorporated herein by reference.

This application is related to application Ser. No. 11/559,392, filed on Nov. 13, 2006 entitled "Intelligent Monitoring Device for Item Transport," and to application Ser. No. 11/559,393, filed on Nov. 13, 2006 entitled "Intelligent Monitoring Device For Refrigeration Systems," both of which are incorporated herein by reference.

FIELD OF THE INVENTION

This invention relates to the field of real-time operating systems, and more specifically to real-time operating systems deployed on controllers with minimal resources controlling reactive systems or applications, such as in wireless nodes of wireless sensor networks.

BACKGROUND

Networks of devices capable of measurement, computation and control have been widely deployed for many years. Increasingly, customers deploying such networks expect effortless integration and improved functionality over previous systems. Wired networks are cumbersome in many applications, in some cases impractical or impossible to deploy, and represent a major expense upon deployment. Wired networks are also generally rigid, and the modifications to this infrastructure can be expensive and usually represent an interruption of services and/or a disruption of normal activities.

Alternatively, wireless systems are increasingly being deployed for certain applications. However, some wireless systems, such as those based on optical links, can be unreliable and inconvenient because they need line of sight between transceivers. Other types of wireless systems have other drawbacks, for example Wi-Fi and Bluetooth networks typically use too much power for battery powered applications, and systems based on cellular telephone infrastructure can be very expensive to deploy.

Wireless sensor networks are a new class of systems that address some of the limitations discussed above. In wireless sensor networks, distributed sensors communicate with each other and with host systems to monitor and control a wide variety of devices. Typically, a wireless sensor network is made of numerous small independent sensor nodes. The sensor nodes can be self-contained units consisting of a radio, sensors, and some on-board computing power. The nodes can be organized in networks on a variety of topologies and using a specific communication protocol.

Wireless sensor networks enable the interconnection of points of interest with added intelligence, enabling measurements, control and communications. The potential applications of short range, low data rate wireless sensors are large. Recent advances of semiconductor integration to create near complete systems on silicon is leading to what is known as 'pervasive computing' where small, smart and inexpensive devices capable of sensing, communicating, computing and control are found everywhere.

However, wireless sensor networks have not yet been widely deployed partially due to the complexity in hardware and software in such systems, which translates to high cost, large size, and large power requirements. In the case of battery powered units, power requirements often limit the applicability due to short battery life. In some circumstances, wireless sensor networks are limited by the use of standardized communication protocols. In many applications, implementers of wireless sensor networks do not to want standardized communication protocols, because they want to protect their applications, defend their customers against competitors, have a need for more capabilities than what the standard provides, want a lower cost than a standard protocol would require, and/or to want to improve the confidentiality of data. Also, standard protocols tend to be more complex (to include as many applications as possible) thus making them require more resources and higher costs, with lower potential for optimizations. Another disadvantage of standard protocols is that they provide no competitive advantage to end customers since their competitors can then easily add the same functionality.

Another reason resource constrained reactive systems such as the nodes used in wireless sensor networks have not been widely deployed is the lack of efficient, small footprint real-time operating systems for use in such systems. Accordingly, the need exists for an improved system upon which to deploy wireless sensor networks that don't suffer from the limitations described above. In particular, there is a need for efficient real-time operating systems to run on the wireless nodes that can be implemented in a small amount of memory.

BRIEF SUMMARY OF THE INVENTION

The present invention is a real-time operating system for use on embedded controllers having minimal resources controlling reactive systems or applications. One application of the present invention is in wireless sensors in a wireless sensor network. By requiring all tasks to have clearly defined start and end points, the present invention eliminates the Waiting state for a task. This allows the RTOS to have a very small memory footprint and for the RTOS to use a single call/return stack.

DETAILED DESCRIPTION

The present invention involves a novel real-time operating system (RTOS) for use on embedded controllers having minimal resources controlling reactive systems or applications. The present invention can be used in the deployment of a wireless sensor network using wireless nodes and wireless host devices. In such a system, each of the sensors and host devices in a wireless sensor network are embedded systems with on-board microcontrollers running specially designed software. Embedded systems frequently have small operating systems on-board, known as real-time operating systems (RTOS), that perform tasks and monitor and control various hardware elements in real-time. In a traditional RTOS, a task can be in one of four states: Running, Ready, Waiting, or Blocked. An example of a prior art RTOS is described in U.S. Pat. No. 6,823,517, incorporated herein by reference. In this example, a task waits on an event by calling a "Wait-on-Event" function, which then causes the scheduler to switch to another task.

In the RTOS of the present invention, tasks can only be in one of three states: Running, Ready, or Blocked. This means task will not wait for events and run on endless loops, but each task has a clearly defined start and end. This allows the system to have a very small memory footprint as well as other advantages that are described in detail below.

In a preferred embodiment, the wireless networks used in an application of the present invention operate in the industrial, scientific and medical (ISM) radio bands. The ISM bands are a set of unlicensed bands, the most recently added of these being 2.4 GHz and 5.6 GHz, which have been defined globally. This means that carriers can operate in all countries around the world, and by proper selection of the frequency and power, the life of the batteries is extended and the security of the information being collected is further enhanced.

The wireless sensors can be configured to measure a variety of factors of interest, and the sensors can be configured to log the information, and can be configured to trigger an alarm if certain parameters are outside predetermined thresholds. Additionally, a secure system can be employed so that the information can be retrieved only by authorized host systems. Host gateways can be used to couple the wireless sensors to an Ethernet, so that collected information is available in real-time through a local or wide-area network.

Wireless Nodes

Figure 1:
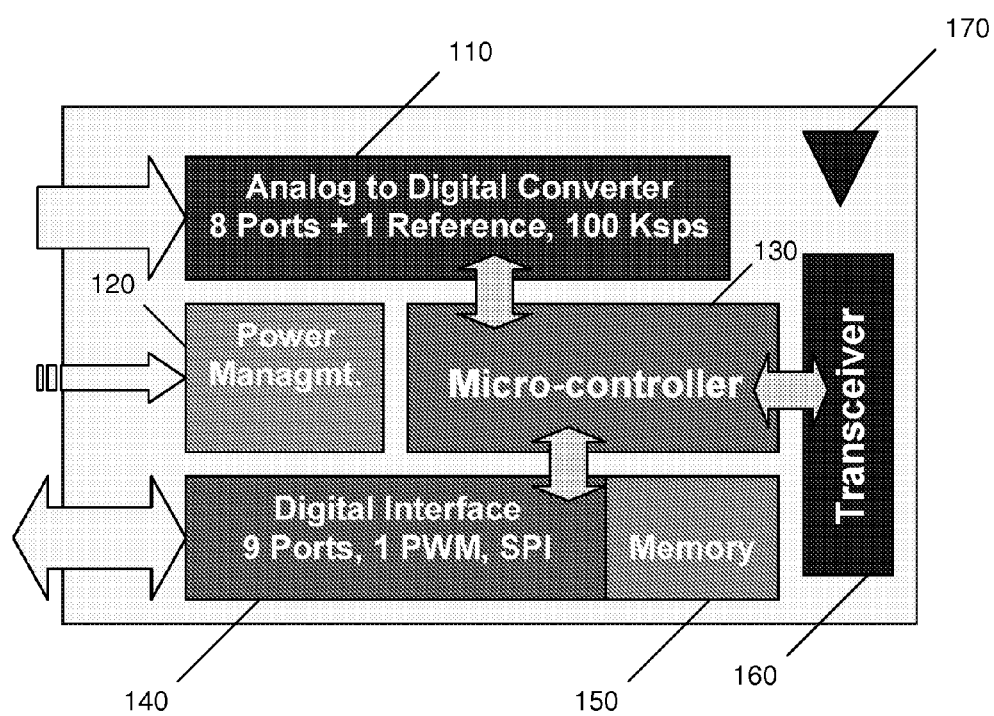
FIG. 1 illustrates a wireless node in accordance with an embodiment of the present invention.

FIG. 1 illustrates an embodiment of a wireless node, upon which the intelligent monitoring units of an application of the present invention are based. The wireless node is a small, low power module that is controlled by microcontroller 130. Analog to digital converter 110 is coupled to microcontroller 130 and provides 8 12-bit A/D inputs and 1 reference input and has a sample rate of 100K samples per second. Digital interface 140 provides digital input and output for microcontroller 130. In the embodiment shown in FIG. 1, 9 digital I/O ports and 1 pulse width modulated (PWM) output are provided along with a serial port interface (SPI). Memory 150 can be used for the storage of program code, run-time variables, buffered data and/or logged environmental data. Transceiver 160 is a wireless transceiver for communication with the host system using antenna 170. In a preferred embodiment wireless transceiver 160 operates in one or more of the ISM frequency bands of 5.6 GHz, 2.4 GHz, 915 MHz, 868 MHz and 433 MHz. Power management logic 120 is responsible for controlling the various low power modes of operation. This unit contains a voltage regulator allowing the unit to operate from 3.6V down to 1.9V and includes several operation modes from active mode, idle mode, and stop mode.

In a preferred embodiment, a wireless node is based on an 8051-core and has 4 KB of RAM and code space. The transceiver in a preferred embodiment is a GFSK radio with 1 Mbps capability (dual receiver) and basic baseband with transmit and receive buffers, CRC and preamble generation and supports 125 1-MHz channels.

In a preferred embodiment, the wireless nodes are hardware modules that measure in various embodiments approximately 23 mm by 16 mm, 16 mm by 16 mm, or 12 mm by 12 mm (all of them including the antenna) and can be operated off of battery power and can be attached to portable devices for monitoring and control. In a preferred embodiment, the wireless nodes have an operating power consumption of approximately 20 mA in receiving mode and 15 mA in transmission mode at 3 Volts, with sleep currents of approximately 0.5 uA, allowing typical battery life to extend into multiple years. More complete electrical characteristics of an embodiment of the wireless node are shown in the table below:

| Parameter | Min | Typ | Max | Unit |
| --- | --- | --- | --- | --- |
| Frequency Range | 2.4 | | 2.524 | GHz |
| Frequency Deviation (+/−) | | 156 | | KHz |
| Channel Spacing | | 1 | | MHz |
| Supply Voltage | 1.9 | 3.3 | 3.6 | Vdc |
| Transmitter Current 0 dBm | | 16 | | mA |
| Transmitter Current −5 dBm | | 13.5 | | mA |
| Transmitter Current −10 dBm | | 12.4 | | mA |
| Transmitter Current −20 dBm | | 11.8 | | mA |
| Receiver mode Current | 19 | | 25 | mA |
| Sleep mode Current | | 2 | | uA |
| TX/RX Data Rate | | | 1000 | Kbps |
| Maximum Transmitter Power | | 0 | 4 | dBm |
| TX 2nd Adjacent Channel power | | | −20 | dBm |
| TX 3rd Adjacent Channel power | | | −40 | dBm |
| Sensitivity @ 10e−3 | | −80 | | dBm |
| ADC Differential Nonlinearity | | 0.5 | | LSB |
| ADC Integral Nonlinearity | | 0.75 | | LSB |
| ADC Signal to Noise Ratio | | 59 | | dBFS |
| ADC Mid-scale offset | | +/−1 | | % FS |
| ADC Gain error | | +/−1 | | % FS |
| ADC Internal Reference | 1.1 | 1.22 | 1.3 | Vdc |

Wireless Host Device

Figure 2:
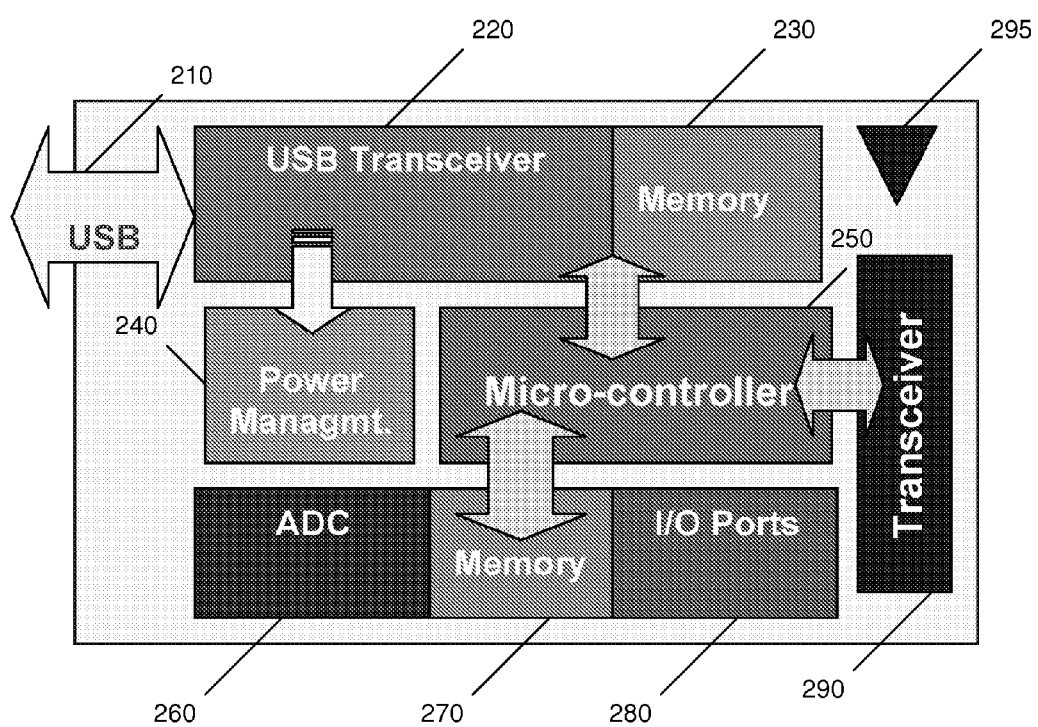
FIG. 2 illustrates a USB-based wireless host device in accordance with an embodiment of the present invention.

FIG. 2 illustrates a wireless host in an embodiment of the present invention. Wireless host devices provide wireless network control and connectivity to stand alone computers or to infrastructure networks. A wireless host is preferably based on the same basic design as a wireless node, and it is designed to be attached via a communication bus to a host system. In the embodiment illustrated in FIG. 2, the communication bus is a USB Bus 210. In alternative embodiments, other communication buses could be used. Microcontroller 250 controls the wireless host and is coupled to USB Transceiver 220 and memory 230. The wireless host also includes analog to digital converter (ADC) 260, memory 270 and I/O Ports 280. Transceiver 290 and antenna 295 are used to communicate with one or more wireless nodes. In a preferred embodiment wireless transceiver 270 operates in one or more of the ISM frequency bands of 5.6 GHz, 2.4 GHz, 915 MHz, 868 MHz and 433 MHz. Power management logic 240 is responsible for controlling the various low power modes of operation. This unit contains a voltage regulator allowing the unit to operate from 3.6V down to 1.9V and includes several operation modes from active mode, idle mode, and stop mode.

In a preferred embodiment, a USB host device is based on an 8051-core with capabilities of instruction processing at 25 MIPS, is compatible with the High Speed USB protocol, has 2.3 KB or RAM, 16 KB of Flash memory and an integrated oscillator. The transceiver in a preferred embodiment is a GFSK radio with 1 Mbps capability (dual receiver) and basic baseband with transmit and receive buffers, CRC and preamble generation and supports 125 1-MHz channels. The wireless host device is preferably designed such that the microcontroller is tightly coupled to the radio, providing maximum performance and control.

In a preferred embodiment, the USB host device is powered through the USB interface itself, so it doesn't need batteries or an external power source. The electrical characteristics of an embodiment of a USB-based wireless host are shown in the table below:

| Parameter | Min | Typ | Max | Unit |
|---|---|---|---|---|
| Frequency Range | 2.400 | | 2.524 | GHz |
| Frequency Deviation (+/−) | | 156 | | KHz |
| Channel Spacing | | 1 | | MHz |
| Supply Voltage | 4.0 | 5.0 | 5.25 | Vdc |
| Transmitter Current 0 dBm | | 23 | | mA |
| Transmitter Current −5 dBm | | 21 | | mA |
| Transmitter Current −10 dBm | | 20 | | mA |
| Transmitter Current −20 dBm | | 19 | | mA |
| Receiver mode Current | 19 | | 35 | mA |
| Shut down mode Current | | 1.1 | | uA |
| TX/RX Data Rate (1 Ch) | | | 1 | Mbps |
| Maximum Transmitter Power | | 0 | 4 | dBm |
| TX 2nd Adjacent Channel power | | | −20 | dBm |
| TX 3rd Adjacent Channel power | | | −40 | dBm |
| Sensitivity @ 10e-3 | | −80 | | dBm |
| Full Speed USB 2.0 | | | 12 | Mbps |
| Micro-processor speed | | | 25 | Mips |
| Memory: Flash | | | 16 | KBytes |
| Operating Temperature | −40 | | +85 | Deg C. |

Figure 3:
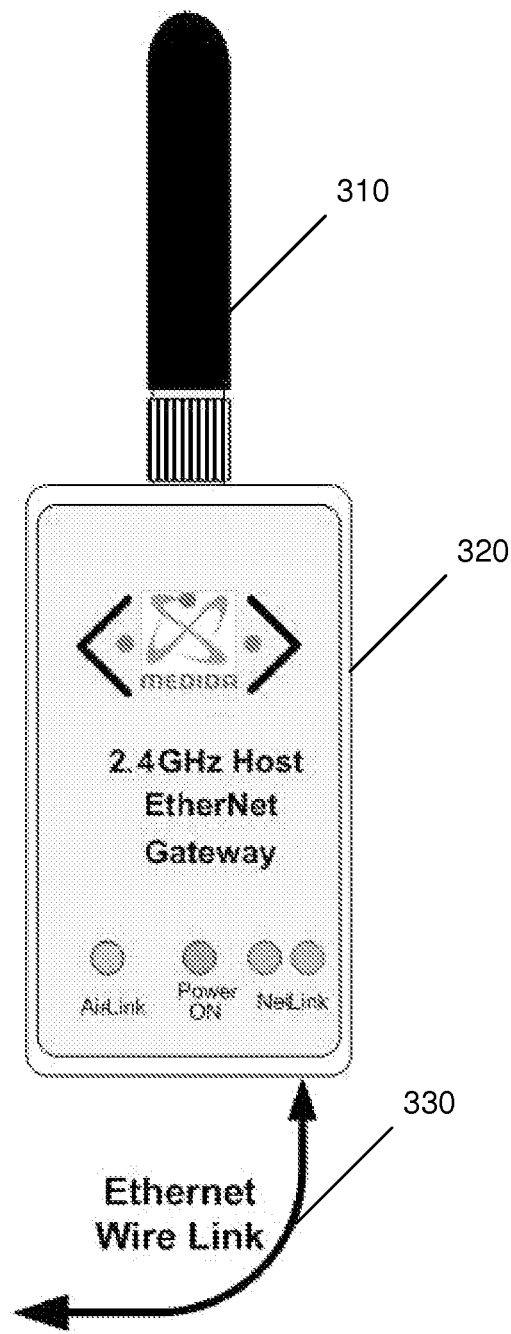
FIG. 3 illustrates an Ethernet-based wireless host device in accordance with an embodiment of the present invention.

An alternative embodiment of a wireless host device is shown in FIG. 3. This device has a wired link to an Ethernet bus 330 instead of a USB port but otherwise device 320 including antenna 310 is of a similar design internally to the system discussed above in connection with FIG. 2. In a preferred embodiment, the Ethernet host device will be powered either using Power-Over-Ethernet, which is known to those of skill in the field, or by an external AC adapter.

While the USB host device is designed to allow connectivity to a single computer, the Ethernet host is designed to allow connectivity to an infrastructure network. As will be understood by those of skill in the art, the USB host could also be used to connect to an infrastructure network and the Ethernet host could also be used to connect to a single computer. Other types of interfaces can be used on the upstream side of the wireless host devices, such as RS-232, RS-485, CAN, FireWire or even another wireless interface such as Wi-Fi, Bluetooth or Cellular. Multiple Ethernet host devices can be placed throughout a manufacturing facility enabling flexibility of installation and reliability. In a preferred embodiment, the Ethernet host is based on a HCS12 microcontroller having 20 MIPS capability, 8 KB of RAM, 64 KB of Flash memory and an integrated oscillator. The transceiver in a preferred embodiment is a GFSK radio with 1 Mbps capability (dual receiver) and basic baseband with transmit and receive buffers, CRC and preamble generation and supports 125 1-MHz channels.

An alternative host device to the USB host device and the Ethernet host device is a general purpose host device (not shown). Such a device would be of similar design and construction as the USB host device and the Ethernet host device, but would have a collection of general purpose I/O pins for connection to a host computer. Such a host device can be incorporated directly into the design of another system using a proprietary interface. In a preferred embodiment, a general purpose host device is based on an 8051-core with 25 MIPS capability, 1.28 KB of RAM, 16 KB of Flash memory and an integrated oscillator. The transceiver in a preferred embodiment is a GFSK radio with 1 Mbps capability (dual receiver) and basic baseband with transmit and receive buffers, CRC and preamble generation and supports 125 1-MHz channels.

Network Communication Protocol

A wireless host as illustrated in FIG. 2 or FIG. 3 and a wireless node as illustrated in FIG. 1 are programmed to communicate over a wireless network using a proprietary protocol that has been optimized for low power and complexity. A variety of topologies are possible using the wireless nodes and wireless host devices. However, in most applications, a simple star topology, where wireless nodes only communicate with host devices, is all that is required. Only a small percentage of applications actually require an ad-hoc network, where wireless nodes can communicate with each other. In a preferred embodiment, the protocol being utilized by the wireless system is application specific optimized. This means that only required functionality is supported, so for example by only supporting star topologies, the wireless nodes of the present invention can be implemented to increase data rate, lower power consumption and reduce cost.

In a preferred embodiment, the protocols used by the present invention are TDMA based, fixed channel and with slow-hopping or fast-hopping. The protocols have limited registration capability, support for bounded-delay (assigned slot) access and support for random events in the uplink direction. It will be appreciated by those of skill in the field that alternative protocol characteristics could be used without departing from the scope of the invention.

A star network is one of the most efficient methods to provide communication for periodic events, since collisions can be eliminated and the nodes can be synchronized to the host while consuming only a minimum amount of energy. Note that although most of the communication will be scheduled and controlled by the host, the protocol provides for alarm type of events (or asynchronous events) that have to be communicated as soon as possible without waiting for the next scheduled communication. This type of communications uses a collision detection methodology instead of a collision avoidance methodology since it is unpredictable and must reach the host as soon as possible.

In an alternative embodiment, the wireless networks described above can be extended to clusters of networks. One example of such an implementation would be to extend the reach of the star topology by using bridges to a complete cluster topology where the hosts in each star would form a backbone for the cluster. Such systems need to be designed to guarantee the reliability of the overall network. In some embodiments, the network protocol is enhanced with the use of data encryption and/or communication security.

Real Time Operating System (RTOS)

The wireless nodes illustrated in FIG. 1 and the wireless host devices illustrated in FIGS. 2 and 3 are preferably programmed with a novel real-time operating system in accordance with the present invention. As is described detail below, the RTOS of the present invention has a very small memory footprint. This enables the use of a physical platform that not only is smaller and of lower cost, but also correctly tuned to the application. In a preferred embodiment, the RTOS of the present invention can be implemented in as little as 2 Kbytes in a wireless node implementation.

The RTOS of the present invention, in addition to having a very small footprint, incorporates a prioritized, preemptive scheduler. The programmer observes a few simple conventions to achieve this result. The simplicity and small size of the present invention comes from a non-blocking scheduling model that allows all context to be kept in the normal run-time stack.

Some of the main features of the RTOS of the present invention are as follows. Tasks are generally programmed as one-shot functions that run to completion and do not wait for events. Thus, a task in an embodiment of the present invention is a simple function which must always complete in a finite amount of time. Tasks can be requested dynamically, and will be scheduled according to their priority, but each instance must do its processing and exit without waiting for any other event to take place.

Preemption is accomplished by making a normal call to the scheduler. Every interrupt handler and every task that requests another task must make a call to the scheduler. Task completion and new task requests are the only scheduling points. A scheduling point is any event that triggers a new decision about which task should be running. The programmer is responsible for explicitly calling the scheduler each time a task is requested. Interrupt service routines (ISRs) are generally the most important trigger for new task requests, so the bulk of these scheduling calls occur in ISRs. The scheduling mechanism of the present invention causes each task to return automatically to the scheduler when it exits.

Figure 4A:
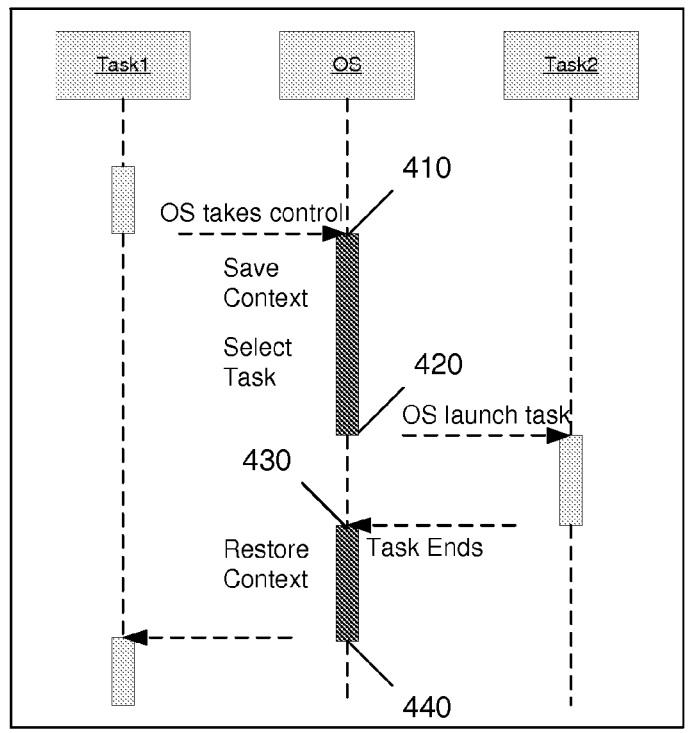
FIG. 4A illustrates task switching in a typical RTOS.

FIG. 4A illustrates task switching in a typical RTOS. A timer tick is provided that will interrupt the running process at time 410, save the context of the process (stack and registers) into some memory location, then runs the scheduler to decide if there is a higher priority task that should run. If a higher priority task is found, the scheduler loads the context of this new task at point 420 into the stack and registers and starts the task. When the task ends at 430, it returns to the scheduler which restores the context of the interrupted task at returns to that task at time 440.

Figure 4B:
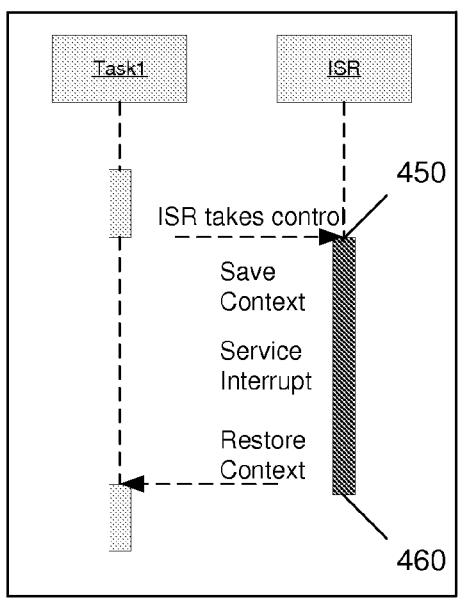
FIG. 4B illustrates interrupt service handling a typical RTOS.

FIG. 4B illustrates interrupt handling in a typical RTOS. First the interrupt takes control at point 450, saves the context of the task into the stack, then services the interrupt then restores the context (registers and stack). Control is returned to the interrupted task at point 460.

In a conventional RTOS only the current running task or an interrupt can schedule a task, so if at this point we can take the decision if the scheduled task should be run, then we can eliminate the timer tick (and its overhead) and provide a more effective RTOS for reactive systems where more of the tasks will be scheduled in response to external events and very possibly inside interrupts as a response to external events.

Figure 5:
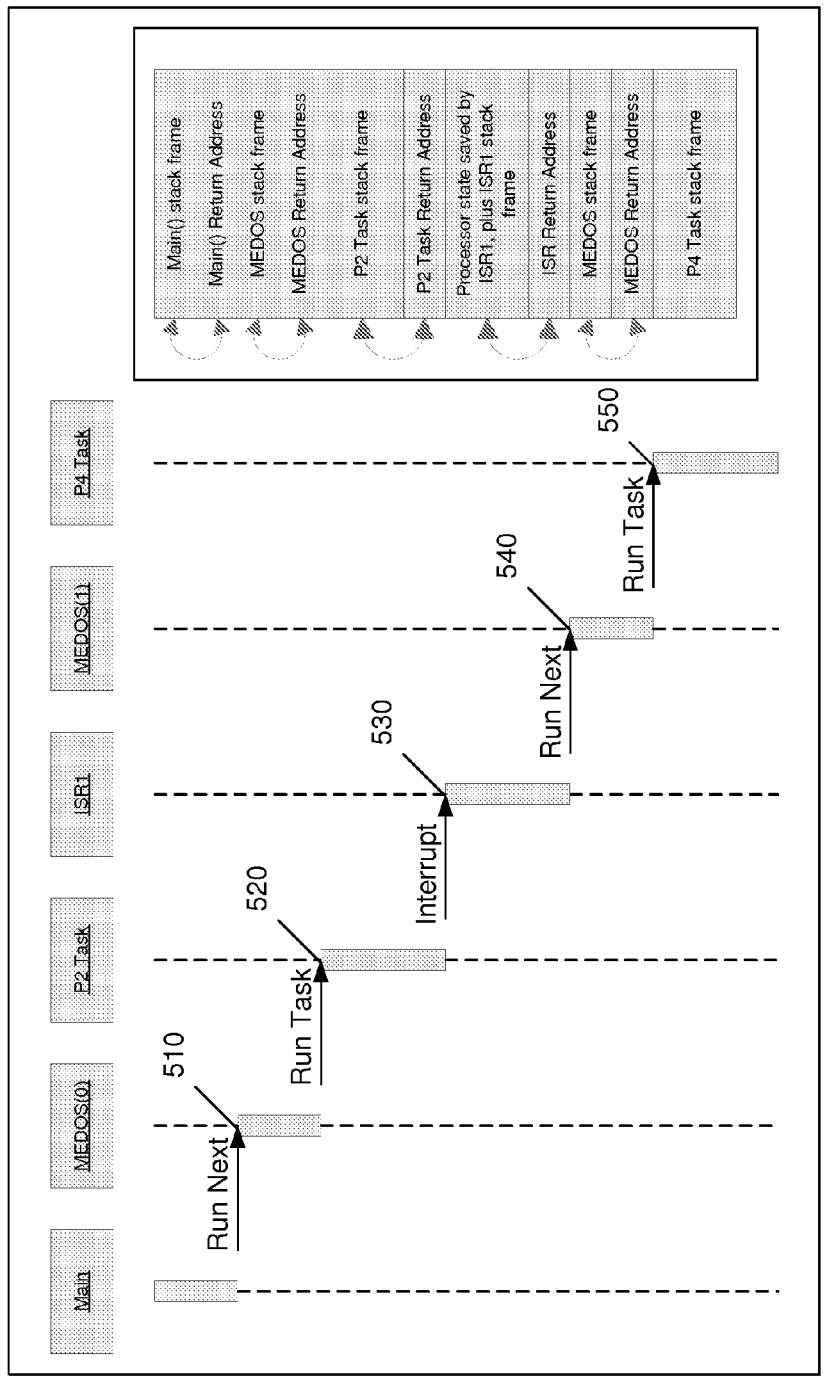
FIG. 5 illustrates context switching in an embodiment of the present invention.

FIG. 5 illustrates context switching in an embodiment of the present invention. In the example illustrated in FIG. 5, at time 510 the scheduler is run from the main loop which turn runs the P2 task at time 520, which is the highest priority task in the ready list. Task P2 runs until an interrupt at time 530. The interrupt service routine services the interrupt and after finishing returns to the scheduler at time 540. At this time, the scheduler determines that task P4 (which was scheduled by the interrupt service routine) has a higher priority than task P2 and P4 is started at time 550.

The stack usage is illustrated on the right side of FIG. 5. Note that all context is stored in the run-time stack, providing a very fast context switch since the scheduler does not have to handle the context save and restore overhead. In a preferred embodiment, the RTOS of the present invention is therefore preemptive, priority-based and non-blocking. However, the kernel is not preemptive in the traditional way using timer ticks and copying of context. The preemption comes from the scheduling of tasks based on events (triggered by interrupts), which occur in interrupt service routines. In a preferred embodiment, the RTOS does not require a timer tick. However, in alternative embodiments, it would not depart from the scope of the invention to include a timer tick to schedule periodic tasks.

The RTOS of the present invention is preferably component-based and application specific. This means that only the portions of the operating system that are needed for a given application are included, thus reducing memory footprint and cost. In a preferred embodiment, the RTOS has no user and kernel modes, no memory protection, no access protection and no memory manager, although these features could be implemented in alternative embodiments.

Figure 6:
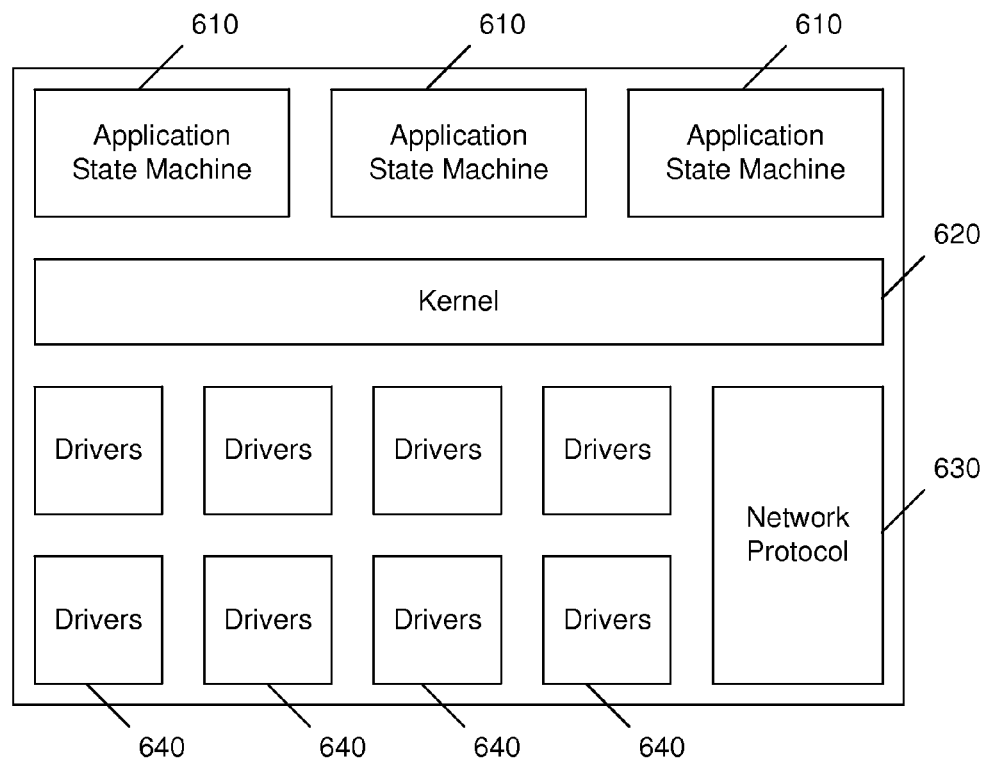
FIG. 6 illustrates the framework model of a wireless node.

FIG. 6 illustrates the framework model of a wireless node. The framework model is a software architecture where application state machines 610 are finite state machines supported by RTOS kernel 620. A collection of drivers 640 and a network protocol block 630 are also present. Examples of drivers include support for I/O, Analog to digital conversation (ADC), timers, power management using pulse width modulation (PWM) and serial ports. Drivers 640 are generally passive, receiving a command, either synchronously or asynchronously, and providing a response signal. Network protocol block 630 is more active, acting more like an application. This model allows pre-designed blocks and protocols to be assembled and reused in an efficient manner, and allows the application designer to provide the high level logic in the form of a state machine.

Tasks can communicate with each other in some embodiments. Depending on the complexity of the inter-task communication, a simple global variable scheme or a more formal mailbox system arrangement can be implemented depending on the application requirements. The inter-task communication mechanism can be seen as a component to the kernel. The RTOS can support periodic as well as aperiodic tasks, since both are present in reactive systems. Periodic tasks are those which happen on a regular basis and might require a timer to perform. Examples of periodic tasks are sampling an analog signal at a specified rate and monitoring a specified parameter at regular intervals. Periodic tasks are tasks which by themselves may not generate their own interrupts, so a timer mechanism can be implemented to generate this signal to the RTOS. Aperiodic tasks are generally triggered by external events that generate an interrupt or signal to the RTOS. Examples of aperiodic tasks are receipt of an external interrupt signal and reception of a packet through the RF radio. The kernel can be very simple or complex depending on the requirements of the application. This allows the kernel services to be expanded as the application requires with services like the mailbox component, timer/clock component, etc.

The RTOS of the present invention can be considered a novel implementation of a hybrid kernel between a classical preemptive system and a classic cooperative system. Traditional preemptive kernels require a timer tick, plus complete context switching (saving and restoring the stack area). In such systems, the highest priority ready task will be run with a latency of up to the period of the timer tick of the kernel. The main disadvantage of the classical preemptive approach is the resources required for context switching and the overhead of the timer tick. Alternatively, cooperative kernels are system in which tasks run to completion before releasing the controller back to the scheduler. While these systems do not have the resource requirements of preemptive kernels, they have the disadvantage of higher latency. In particular, the latency for a high priority task cannot be easily constrained, since it depends on the task currently running. In contrast to either of these approaches, the present invention eliminates most of the resource requirements of the classical preemptive system while eliminating the unbounded latency of cooperative kernels.

Tools and Utilities

Certain tools and utilities necessary to design, implement and simulate the platform are important to the efficient implementation and fast turn around of an application. Preferably, a number of tools are provided to work in conjunction with the framework model to allow design, implementation and testing of an application.

Framework Validation Tool This is a tool that checks for inconsistencies, race conditions and other issues in an application. Also, the Framework Validation Tool provides some simulation of the model to give the application designer assurance of the state machine logic. Note that when a task is pre-empted, state remains on the run-time stack. This state is typically very small (relating to sensor measurements, etc.) but different combinations of task interruption can lead to different amounts of stack space used. Thus, it is important to ensure that the stack does not overflow. The Framework Validation Tool can analyze the overall system to check for stack overflow, determine the size of the stack, and the total memory usage. This allows the maximum utilization of RAM space, which may be a limited resource.

Framework Compiler The application construct would be translated into a base language, such as C, to be later compiled and downloaded into the respective device.

Network Simulator The network simulation tools allow for the simulation of the wireless network specific to the wireless nodes and the application. The Network Simulator can simulate the physical network including all protocol specifics and determine parameters such as reliability data throughput, and packet rate per node.

Application Development Wizard This tool has a graphical interface front-end and provides access to all the other tools in a structured manner such that the application design process is greatly simplified.

The present invention has been described above in connection with several preferred embodiments. This has been done for purposes of illustration only, and variations of the inventions will be readily apparent to those skilled in the art and also fall within the scope of the invention.

The invention claimed is:

1. A microcontroller based system for resource constrained environments comprising:
a microcontroller used to control a wireless sensor node in a wireless sensor network comprising memory storing program code, wherein execution of said program code by said microcontroller implements a real-time operating system (RTOS) comprising:
a preemptive, priority based, non-blocking scheduler for managing task execution including task switching;
a plurality of defined tasks as code sets, wherein said tasks have clearly defined start and end points and run to completion without waiting for events; and
an interrupt service routine configured to respond to events and in response to those events to schedule tasks for execution such that at the end of said interrupt service routine said scheduler determines if a task that was interrupted should be preempted by a newly scheduled task;
wherein a single call-return stack is utilized by said scheduler common to said tasks and wherein the task resume addresses of said tasks are maintained on said single call-return stack such that said tasks are resumed in the reverse order in which they are suspended;
wherein said wireless sensor node is configured to collect measurements of a plurality of parameters, to log said measurements and to trigger an alarm if said parameters are outside predetermined thresholds; and
wherein said wireless sensor node is configured to communicate with a host gateway coupled to a wired network, so that said measurements are available in real-time through a local or wide-area network and wherein communication to said host is secure requiring authorization.

2. The microcontroller based system of claim 1 wherein the single stack is implemented as a general-purpose stack.

3. The microcontroller based system of claim 1 comprising a minimal task control block assigned to each task.

4. The microcontroller based system of claim 1 further comprising a timer tick routine configured to schedule periodic tasks.

5. A method for operating a microcontroller based system comprising the steps of:
executing program code by a microcontroller used to control a wireless sensor node in a wireless sensor network to implement a real-time operating system (RTOS) comprising a preemptive, priority based, non-blocking task scheduler;
calling defined tasks by the scheduler, wherein said tasks have clearly defined start and end points and run to completion without waiting for events; and
executing an interrupt service routine configured to respond to events and in response to those events to schedule tasks for execution such that at the end of said interrupt service routine said scheduler determines if a task that was interrupted should be preempted by a newly scheduled task;
wherein a single call-return stack is utilized by said scheduler common to said tasks and wherein the task resume addresses of said tasks are maintained on said single call-return stack such that said tasks are resumed in the reverse order in which they are suspended;
wherein said wireless sensor node is configured to collect measurements of a plurality of parameters, to log said measurements and to trigger an alarm if said parameters are outside predetermined thresholds; and
wherein said wireless sensor node is configured to communicate with a host gateway coupled to a wired network, so that said measurements are available in real-time through a local or wide-area network and wherein communication to said host is secure requiring authorization.

6. The method of claim 5 wherein the single stack is implemented as a general-purpose stack.

7. The method of claim 5 comprising a minimal task control block assigned to each task.

8. The method of claim 5 further comprising the step of executing a timer tick routine configured to schedule periodic tasks.

9. The microcontroller based system of claim 1 wherein at least some of said plurality of defined tasks comprise a priority level and said scheduler determines if a task should be preempted based at least in part on said priority level.

10. The method of claim 5 wherein at least some of said plurality of defined tasks comprise a priority level and said scheduler determines if a task should be preempted based at least in part on said priority level.

\* \* \* \* \*